Patented Nov. 6, 1951

2,574,324

UNITED STATES PATENT OFFICE 2,574,324

MANUFACTURE OF PYRAZINES

Richard Paul Germann, Plainfield, N. J., assignor to American Cyanamid Company, New York, N. Y., a corporation of Maine No Drawing. Application December 14, 1949, Serial No. 133,013

2 Claims. (Cl. 260—250)

This invention is concerned with the halogenation of heterocyclic compounds in the vapor phase. More particularly, the invention is concerned with the vapor-phase halogenation of pyrazine. Specifically, the invention is concerned with halogenating pyrazine in the vapor phase, using water and sulfur dioxide as diluents.

Pyrazine, as a starting material for the manufacture of substituted pyrazines, is variously useful in many fields, particularly in the manufacture of drugs and dyestuffs. However, the nature of the pyrazine ring is such that it is not readily amenable to substitution on the carbon atoms. Unless reaction conditions are quite drastic, the reaction rate is low and yields are extremely poor. On the other hand, under conditions at which the reaction rate for the substitution is adequate, the reaction conditions tend to cleave the ring structure.

An excellent illustration of the problem is found in the manufacture of 2-aminopyrazine. No suitable method for the direct amination of the pyrazine ring is commercially available. However, a suitable halogenated pyrazine may be comparatively simple converted to the corresponding aminopyrazine. The latter being a source material for a number of interesting possibilities in the manufacture of various dyestuffs, there exists a demand for a suitable method of halogenating pyrazine.

Halogenation of pyrazine, though theoretically simple, actually is extremely difficult. It has been predicted that such reaction is impossible. In the liquid phase, halogens very rapidly destroy pyrazine at temperatures at which any reaction occurs. The most favorable opportunity would, therefore, appear to be in the vapor phase, in which the rate of destruction of the pyrazine is much lower.

It is possible to produce some monohalogenopyrazine by admixing a suitable halogen, such as chlorine or bromine, with the pyrazine and passing it through a heated reaction zone. The yield is extremely poor, a great deal of tarry deposit from breakdown of the pyrazine is found, and very little polyhalogenopyrazine is formed. The latter is particularly surprising.

This reaction appears to offer some degree of promise if it can be readily controlled. Previous attempts in this field have been in the nature of the addition of diluent inert gases. Among these have been water vapor and nitrogen. Both have proved somewhat better than when they are not present. The reaction still produces an excess of tarry breakdown and/or polymerization products, and the yield is too poor to be satisfactory. In addition, to be effective at all, the process must be very carefully controlled. At temperatures below 450° C., the yield of halogenopyrazine is too low to be practical. At 500° C., the destruction of pyrazine without forming useful product is excessive.

Despite the unprepossessing nature of the previous experience in this field, there remains a demand for a suitable process, whereby the direct halogenation of pyrazine in the vapor phase may be accomplished. Such a process should be capable of producing satisfactorily high yield. It should not produce excessive amounts of polyhalogenopyrazines. The production of tarry waste products should be minimized. The reaction conditions should not be excessively critical.

It is, therefore, the principal object of the present invention to provide a relatively simple, readily controllable method for the vapor-phase halogenation of pyrazine.

In view of the past failures in this field, the successful accomplishment of the desired objects has proved quite simple. In general, it comprises the use of diluent gases, as in the prior art, with the addition thereto of a suitable amount of sulfur dioxide. In some manner, not readily subject to explanation, the sulfur dioxide appears to enter into the reaction. It not only makes the reaction conditions far less sensitive, but has additional benefits. The yield of useful products is improved. The amount of tarry breakdown deposits is decreased. The amount of pyrazine destroyed without useful benefit is decreased.

With respect to the diluent vapors, conditions for the reaction, as carried out in the present invention, are not particularly critical. Any inert vapor may be used. Among these are water vapor, nitrogen, carbon monoxide, and the like. There is, however, a distinct preference for the use of water. Its vapor has a higher specific heat, which makes it more useful in controlling reaction conditions. Further, in feeding pyrazine to the process, it is convenient to feed a liquid rather than a solid. For purposes of feeding, an approximately 50% solution of pyrazine in water is desirable. Fortunately, this provides one of the better proportions of water to pyrazine for use in the vapor phase reactor. The concentration of this solution may be raised or lowered as much as 10% without radically altering reaction conditions.

Control of the contact time, by use of the water vapor diluent, is more important than the effect of its proportion to pyrazine on the reaction proper. The contact time should not be appreciably less than about 0.5 second, otherwise an excessively high reaction temperature is required. On the other hand, the contact time which is greater than about 15 seconds serves no useful purpose, and at the higher temperature ranges which are useful, longer contact times may result in lowered yields of the desirable product. Accordingly, the amount of water in the pyrazine solution and the rate of feed of solution should be adjusted to give a contact time of about 0.5–15 seconds, for the temperature used.

In carrying out the present process, it has been found desirable to thoroughly pre-mix the reactants at a temperature somewhat lower than that at which halogenation is instituted. For this reason, the first step is to feed the pyrazine to a vaporizer. The feed may be either as the solution discussed above, or as pyrazine per se. The correct amount of pyrazine and diluent is added to the circuit. If a solution feed is not used, and water is to be the diluent, it may be separately vaporized and mixed with the vaporized pyrazine. Or else water may be separately fed to the same vaporizer.

Vaporized pyrazine is then passed to a suitable preheater. In this portion of the circuit, the temperature should not attain that at which the reaction rate becomes appreciable. Since temperatures as low as 375° C. may be used in the reaction chamber, it is usually desirable to pre-heat the vapors to some temperature somewhat short of this temperature. A good pre-heating practice is to carry the vapors to about 250–450° C. When a diluent other than water vapor, or water vapor prepared in a separate vaporizer, is used, it may be combined with the vaporized pyrazine at any stage up to that including the preheating zone.

As in the case of the diluent vapor, conditions with respect to the feed of, and the amount of, halogen are subject to some variation. Theoretically, any of the halogens should be available and useful. However, for practical purposes, the process is usually concerned with chlorine and bromine. Chlorine because it is a permanent gas and readily handled is perhaps preferable. Bromine appears to be slightly more reactive and can be treated at somewhat lower temperature conditions. If bromine is used, it too must be vaporized. Preferably, this is done before admixture with pyrazine, because, as noted, in the liquid phase halogens attack pyrazine very rapidly. The halogen vapor may be admixed with the feed at any stage up to, and including, the pre-heating zone.

In amount, some care should be taken as to the addition of the halogen. Since the halogenation reaction is exothermic, if some care is not taken, it may become excessively violent and the temperature rise in the reaction chamber may be too great. It is for this reason that water vapor, with its higher specific heat, is preferable, as noted above. In addition, it has been found that not more than 1 mol of halogen per mol of unreacted pyrazine should be present in the reaction chamber, until reaction is substantially complete. For these reasons, the molar equivalents of halogen should not exceed, per mol of pyrazine, one to one. On the other hand, too low a halogen-pyrazine ratio results in too poor a yield. For this reason, a halogen-pyrazine ratio, in the material entering the reaction chamber, of about 0.85–0.95, with an average of about 0.9, is preferred.

A particularly novel feature of the present invention, as noted above, is the use of sulfur dioxide. The exact nature of its effect on the reaction is not wholly understood. It has been found, however, that a molar ratio of about 1:1 for sulfur dioxide to pyrazine produces the desired results. This may be lowered to about a 0.5 ratio, without serious harm. On the other hand, amounts above a ratio of about 2.0 have no particularly beneficial effect and, apparently, produce excessive dilution. A molar ratio of 1:1 is, therefore, about the preferred method of operation.

As noted, the reaction is exothermic. Temperature in the reaction chamber itself is, therefore, a variable. It will be lower at the inlet than at the outlet. The temperatures give, for control purposes, the average temperature in the reaction chamber. Perhaps the preferred range is about 350–450° C. This may be decreased to about 375° C., particularly when bromine is the halogen being used. It may be also increased to about 500° C., particularly when chlorine is the halogen being used. In general, a temperature of about 25° lower than that preferred for chlorine is found advantageous when using bromine.

Observation of the temperature in the reaction zone forms a good method of control. As noted above, a good average practice is to attempt operation at from 350–500° C. Because an absolutely uniform feed rate of all the reactants is not always possible, there will be fluctuations in this temperature, which should not be allowed to go too low. On the other hand, it may go 25–50° above the usual maximum without damage, provided the time that these temperatures are maintained is not appreciably long. Adjustment should be made to return the temperature to the correct 350–500° C. average. Use of this average temperature, therefore, permits a variation on either side without going outside the general desirable temperature range.

The reacted mixture is passed to a suitable condenser, from which the liquid products are recovered. This is ordinarily done by neutralizing the condensate with sodium carbonate or caustic soda. The neutral condensate is then steam-distilled and the distillate is extracted with a suitable solvent, such as benzene. Benzene extract may be then fractionally distilled to recover the benzene, any unreacted pyrazine, chloropyrazine, and any polyhalogenopyrazines. The latter are usually relatively small in amount if the preferred conditions are maintained.

So far as the apparatus is concerned, there are no particular limitations. Any apparatus having the necessary units of vaporizer, preheater, reaction zone, condenser, and apparatus for fractional distillation may be used. The materials of construction should be neutral during the reaction. Stainless steel, glass, quartz, and glass-lined metal apparatus have been found satisfactory.

The invention will be illustrated in conjunction with the following specific examples, which are intended as illustrative only, and not by way of limitation. Unless otherwise noted, all parts are by weight.

*Example 1*

1917 parts of a 50% aqueous solution of pyrazine is fed into a flash vaporizer at a temperature of 115–125° C. The vapor is passed into a preheater where it is heated gradually to 390° C. The vapor is then mixed with cold chlorine vapor at a point just below the preheater at such a rate that 1 mol of pyrazine is mixed with 0.9 mol of chlorine. The temperature just below the mixing point averages 168° C. Reaction takes place in a convertor below the mixing zone at an average maximum temperature of 371° C. at the hot spot during a 7.3 second reaction time. The hot vapors from the convertor are passed into a flask held at 0° C. The unreacted gases pass through a water-cooled condenser to the atmosphere. The product which is condensed in the flask is brought to pH 8–8.5 with 850 cc. of 50% NaOH. It is then diluted to twice its volume with water and steam stripped. The water-pyrazine-chloropyrazine-dichloropyrazine mixture is extracted by means of a 4 stage countercurrent extraction using equal volumes of benzene and the solution to be extracted. The benzene extract is distilled to yield 280 parts of pyrazine, about 41 parts of chloropyrazine (4.3%), and about 25 parts of dichloropyrazine (2.0%).

*Example 2*

1554 parts of a 50% aqueous solution of pyrazine is fed into a flash vaporizer at a temperature of 115–125° C. The vapor is passed into a preheater where it is heated gradually to 374° C. The vapor is then mixed with cold chlorine and $SO_2$ vapor at a point just below the preheater at such a rate that 1 mol of pyrazine is mixed with 0.9 mol of chlorine and 0.5 mol $SO_2$. The temperature just below the mixing point averages 186° C. The reaction takes place in a convertor below the mixing zone at an average maximum temperature at the hot spot of 375° C. during a 7.0 second reaction time. The hot vapors from the convertor are passed into a flask held at 0° C. The unreacted gases pass through a water-cooled condenser to the atmosphere. The product which is condensed in the flask is brought to a pH of 8–8.5 with 25 g. $Na_2CO_3$ and 600 cc. 50% NaOH. It is diluted to twice its volume with water and steam stripped. The water-pyrazine-chloropyrazine-dichloropyrazine mixture is extracted by means of a 4 stage countercurrent extraction using equal volumes of benzene and the solution to be extracted. The benzene extract is distilled to yield 195 parts of pyrazine, 314 parts chloropyrazine (37.7%) and 49 parts mostly dichloropyrazine (4.5%).

*Example 3*

| Average Convertor Temp. | Contact Time | Molar Ratio, Pyr./$Cl_2$/$SO_2$ | Per Cent Conversion | | Per Cent Yield | |
|---|---|---|---|---|---|---|
| | | | Without $SO_2$ | With $SO_2$ | Without $SO_2$ | With $SO_2$ |
| 371 | 7.3 | 1/0.9/0 | 3.0 | ---- | 4.3 | ---- |
| 375 | 7.0 | 1/0.9/.5 | ---- | 28.2 | ---- | 37.7 |
| 389 | 4.9 | 1/0.9/0 | 17.7 | ---- | 28.6 | ---- |
| 391 | 6.9 | 1/0.9/0 | 34.1 | ---- | 41.5 | ---- |
| 394 | 6.0 | 1/0.9/0 | 23.8 | ---- | 25.7 | ---- |
| 394 | 6.2 | 1/0.9/0 | 16.7 | ---- | 23.4 | ---- |
| 397 | 6.5 | 1/0.9/1 | ---- | 37.0 | ---- | 57.4 |
| 399 | 9.2 | 1/0.9/0 | 25.2 | ---- | 25.2 | ---- |
| 400 | 8.6 | 1/0.9/.5 | ---- | 45.5 | ---- | 51.9 |
| 401 | 7.0 | 1/0.9/0 | 30.6 | ---- | 36.7 | ---- |
| 402 | 8.5 | 1/0.9/1.5 | ---- | 39.2 | ---- | 57.2 |
| 420 | 2.5 | 1/0.9/0 | 18.5 | ---- | 29.7 | ---- |
| 422 | 6.1 | 1/0.9/0 | 24.1 | ---- | 32.5 | ---- |
| 424 | 6.4 | 1/0.9/0 | 29.4 | ---- | 37.3 | ---- |
| 425 | 9.6 | 1/0.9/1 | ---- | 42.7 | ---- | 50.0 |
| 429 | 6.8 | 1/0.9/0 | 33.6 | ---- | 45.6 | ---- |
| 431 | 2.9 | 1/0.9/0 | 25.9 | ---- | 40.7 | ---- |
| 453 | 3.3 | 1/0.9/1 | ---- | 39.8 | ---- | 52.5 |
| 490 | 8.5 | 1/0.9/1 | ---- | 29.0 | ---- | 40.2 |
| 493 | 4.3 | 1/0.92/.84 | ---- | 32.7 | ---- | 45.6 |
| Average | | | 25.8 | 36.8 | 30.9 | 49.1 |

I claim:

1. The method of producing halogenated pyrazines in the vapor phase which comprises admixing vaporized pyrazine and a diluent selected from the group consisting of water vapor, nitrogen and carbon dioxide in amounts sufficient to permit ready maintenance of a contact time of 0.5–15 seconds at a reaction temperature of 350–500° C.; admixing therewith 0.85–0.95 mol of a halogen selected from bromine and chlorine and 0.5–2.0 mols of sulfur dioxide per mol of pyrazine; pre-heating the mixture to 250–450° C.; passing the pre-heated mixture through the reaction chamber at a reaction temperature of 350–500° C.; maintaining the contact time from 0.5–15 seconds; condensing the reacted mixture and isolating the monohalogenopyrazine content of the condensate.

2. A process according to claim 1 in which the diluent is water vapor, dilution being obtained by vaporizing a mixture of pyrazine with 50% ± by volume of water.

RICHARD PAUL GERMANN.

No references cited.